Patented Jan. 14, 1947

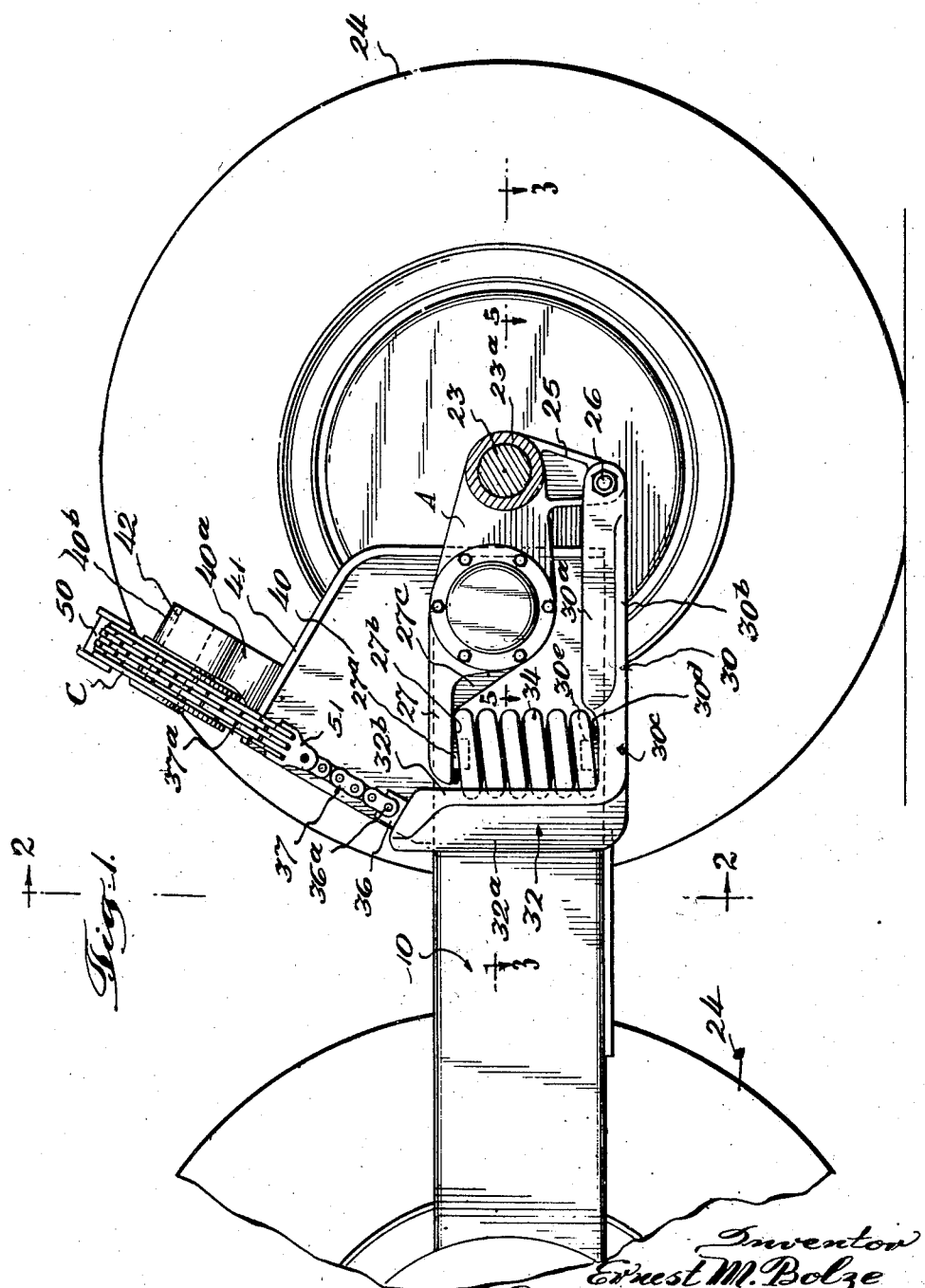

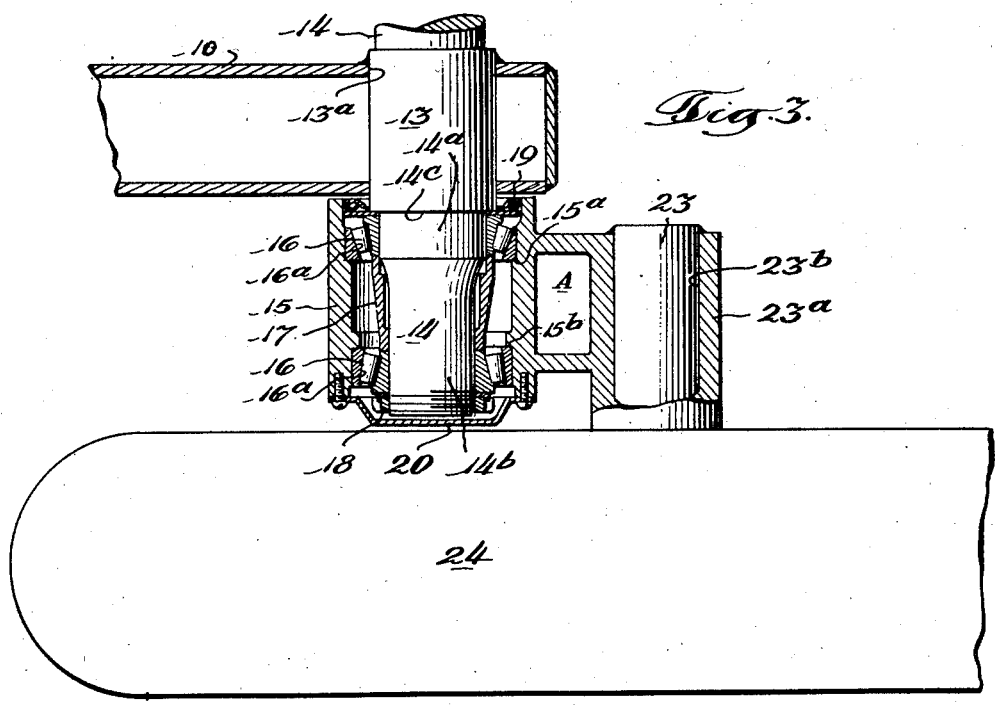
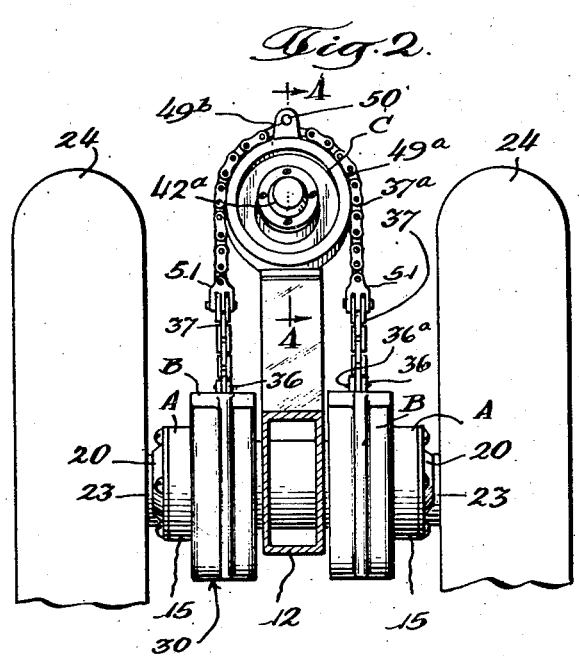
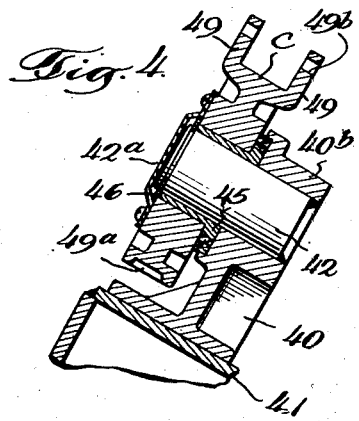

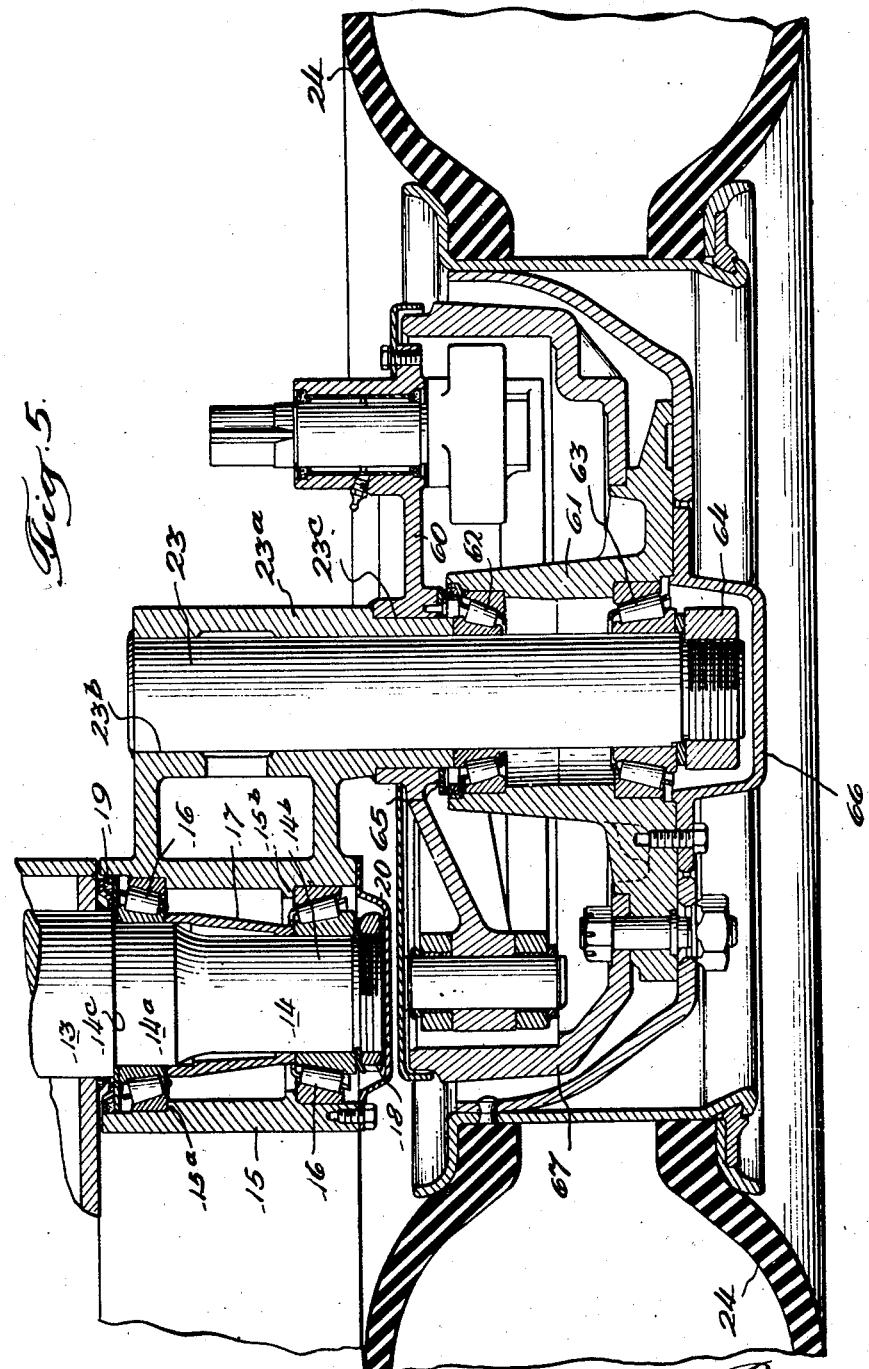

2,414,286

UNITED STATES PATENT OFFICE 2,414,286

VEHICLE WHEEL MOUNTING

Ernest M. Bolze, San Diego, Calif., assignor to Hyster Company, Portland, Oreg., a corporation of Oregon Application September 13, 1944, Serial No. 553,907

13 Claims. (Cl. 280—104)

The present invention relates to mountings for vehicle wheels of the type in which the wheels are arranged in pairs, each wheel of each pair being carried by a separate shaft, with the shafts arranged in substantial alignment when the wheels are equally loaded on level terrain.

This invention relates to improvements in vehicle wheel mountings of the type described in which the wheels of each pair are spaced a short distance from each other in a direction axially of their shafts and so mounted that they may roll independently of each other and also so that each wheel may be raised above or drop below the level of the other, but with the wheels of each pair so connected by a compensating mechanism that each wheel will at all times carry its share of the load.

In the vehicle wheel mountings of the prior art provided with compensating mechanism, of which the present mountings are improvements, the wheel spindles were mounted on hinged wheel-carrying arms, and the free ends of the arms were each connected to the end of a longitudinally extending pivotally mounted leaf spring.

In those devices the leaf springs were located above, but in the same plane as the wheel-carrying arms, and the other ends of the longitudinally extending leaf springs were so connected as to cause the ends of the springs of each pair to move upward or downward in opposite directions.

One of the disadvantages of these prior art devices lay in the fact that each of the spring members must be pivotally and separately mounted, necessitating the use of extra bearings, which also require separate lubrication.

Another disadvantage of those prior art devices was that the leaf springs located above the wheel-carrying arms occupy space which might be utilized advantageously for brake mechanism or other purposes.

One of the objects of the present invention is the provision of an improved vehicle wheel mounting by means of which the necessity for separate pivotal mountings for the spring members on the vehicle frame or other support is eliminated, and to provide a simple compensating means for interconnecting the wheel-carrying arms of each pair of wheels and for providing adequate spring mounting for the wheels for cushioning and reducing sudden shocks received by either or both wheels.

The present invention is also an improvement over the conventional axle vehicles of the type in which two wheels are fixedly secured together to rotate together on or with the same axle.

Among the disadvantages of these conventional wheel mountings of the prior art are the following characteristics:

1. On uneven road surface, when one of the wheels of the prior art devices engages a bump, it is overloaded, and the load is carried at a reduced radius, while the other tire surface engages the highway at a longer radius; therefore, slippage occurs on the tire that bears the lesser load, which wears the tires.

2. On turns of the vehicle, the two wheels of the prior art being fixedly secured to rotate together, slippage must occur on one or both wheels, resulting in wear on the tires.

3. Unevenness in the roadway engaged by the tires of a pair of wheels of the prior art devices results in terrific tire shock upon engagement of the loaded tire with the raised surface of the highway so that the vast majority of all tire shocks are absorbed by one tire.

4. The uneven loading and securement of the wheels of a pair of the prior art devices, to rotate together, also produce tire drag, increased highway stresses, overload of wheels and wheel bearings, increased load bounce and sway, decreased brake efficiency, and other undesirable characteristics.

Another object of the invention is the elimination of the undesirable characteristics of the vehicle wheel mountings of the prior art above described, in which two wheels are usually mounted to rotate together, and the provision of a simple, sturdy, effective mechanism by means of which each wheel of a pair is free to rotate, independently of the other wheel, and to bear its share of the load, irrespective of the turning of the vehicle or the engagement of the wheels with uneven terrain.

Other objects and advantages of the invention will be apparent from the following description and the accompanying drawings, in which similar characters of reference indicate similar parts throughout the several views.

Referring to the drawings, of which there are 3 sheets:

Fig. 1 is a side elevational view of a portion of a vehicle frame showing my improved mounting for a pair of wheels carried by the vehicle frame, the outside wheel and wheel spindle having been removed for the purpose of clarity;

Fig. 2 is a fragmentary sectional view of the pair of wheel mountings of Fig. 1, taken on the line 2—2 of Fig. 1, looking in the direction of the arrows;

Fig. 3 is a horizontal sectional view, taken through the suspension shaft for the wheel mountings, on the plane of the line 3—3 of Fig. 1;

Fig. 4 is a fragmentary sectional view, taken through the sheave mounting, on the plane of the line 4—4 of Fig. 2;

Fig. 5 is a fragmentary sectional view, taken on a plane passing through the axes of both of the suspension shaft and the wheel shaft, on the plane of the line 5—5 of Fig. 1.

Referring to Figs. 1 to 3, each wheel spindle 23 is supported upon a pivotally mounted wheel-carrying arm or assembly A.

Referring to Fig. 3, the wheel-carrying arm or assembly A is pivoted upon a suspension shaft 13, which extends at substantially right angles to the frame member 10, which may be mounted in the transverse shaft bores 13a in the frame member 10.

I desire it to be understood that the suspension shaft 13 may be carried by the vehicle frame 10 or by any suitable part carried by the vehicle frame, in accordance with the practices of the prior art, for supporting wheel shafts.

The suspension shaft 13 may be welded or otherwise secured in the shaft bores 13a.

Each end of the shaft 13 is preferably reduced, as shown at 14, and the wheel-carrying assembly A is rotatably mounted thereon by means of suitable anti-friction bearings. The wheel-carrying arm or assembly A may consist of a metal member which is provided with a hub 15, having a suitable through bore and counterbores 16a at each end for supporting the outer races of the anti-friction bearings 16. The inner races of the anti-friction bearings 16 are mounted on reduced portions 14a and 14b of the shaft portion 14, the innermost of these anti-friction bearing races engaging an annular shoulder 14c.

A suitable spacer 17 is interposed between the inner races of the anti-friction bearings 16, and these races are held in place by a lock nut 18. The outer races engage the opposed annular shoulders 15a and 15b in the hub 15, whereby anti-friction bearings are adapted to resist end thrust applied in either direction to the hub 15.

Any suitable type of oil seal 19 and end plate 20 may be employed to seal the housing of the hub and hold the lubricant therein.

At one end the wheel-carrying assembly or arm A is provided with a second hub formation 23a, having a suitable bore 23b for receiving the spindle 23. Spindle 23 may be fixedly secured in the bore 23b by welding or other suitable means. Each vehicle wheel 24 is journalled upon a wheel spindle 23, as shown in Fig. 5, further to be described.

Each wheel-carrying assembly or arm A (Fig. 1) is provided with a radially extending portion or bellcrank arm 25, which preferably extends downwardly and is pivotally connected by means of a pin 26 to an associated member or spring hanger arm 30.

The arm 30 and extending portion 25 are each provided with bores for receiving pin 26, which may be riveted or otherwise secured against axial movement. The associated member or spring hanger arm 30 may consist of a metal member suitably reinforced by being provided with vertically extending and horizontally extending reinforcing flanges 30a and 30b. Its cross-sectional shape may be of any suitable, reinforced shape; but it is preferably provided with a substantially flat portion 30c to provide a seat for a helical compression spring 34.

The spring seat 30d is preferably provided with an upwardly extending cylindrical lug 30e, engaging the inside of the spring and holding it against lateral movement. The associated member or spring hanger arm preferably extends laterally with respect to the bellcrank arm 25 underneath the hinge or bearing for the wheel-supporting arm or assembly A and beyond its bearing, where the spring 34 is supported.

The spring-supporting arm 30 preferably terminates in an upwardly extending portion 32, which may also be provided with reinforcing flanges 32a and 32b, having a substantially T-shaped cross-section. At its upper end the upwardly extending portion 32 of arm 30 is provided with a lug 36, which is apertured to receive one of the pins of a chain 37, the chain being secured to lug 36 by a pin 36a passing through the chain link and lug and riveted in place.

The chain 37 preferably has another wider chain portion 37a, which extends over a compensating wheel or pulley sheave C. In order to support the compensating wheel C, the frame member 10 is provided with an upwardly extending supporting bracket 40, which may be welded thereto, and which is preferably provided with a top flange 41, extending at right angles to the body of the bracket 40.

The flange 41 supports a cast metal bearing bracket 40a, which is secured to flange 41 by welding or bolts or other convenient fastening means, and which is provided with a hub 40b for supporting the shaft 42 that carries the compensating wheel C (Fig. 4).

The shaft 42 may be welded in its bore in the hub 40b, and at its outer end it carries a bearing bushing 45 for supporting the compensating wheel C. Any suitable thrust means may be used on shaft 42 for holding the wheel C in place, such as a spring ring 46 mounted in a groove in the shaft 42 and projecting sufficiently to engage the bushing 45.

The bearing bushing 45 may have a frictional fit in the hub of compensating wheel C so that it turns with the wheel, and the end of shaft 42 may be covered by means of a suitable cap 42a for retaining lubricant in place.

The compensating wheel C may consist of a metal member formed with a substantially cylindrical periphery 49a for receiving the chain portion 37a. At its upper side the periphery 49a is preferably provided with a pair of radially projecting ears or securing flanges provided with aligned apertures 49b. A pin 50 passed through these apertures and secured therein by riveting, or other convenient means, engages the chain section 37a at a narrower part of the link between two of the pivots of the chain so that the chain is effectively secured to the wheel at this point.

The chain portion 37 and chain portion 37a may be joined by means of a connecting link 51, which has a pintle that is connected with section 37 at right angles to the pintle that is connected to section 37a, thereby providing a substantially universal joint in the chain at 51.

The opposite end of the chain section 37a is of similar shape and provided with a section 37 for connection to a similar spring-carrying arm or associated member 30 on the other side of the frame member 10.

As each wheel of the pair is supported by a similar structure, it is not necessary to describe the supports for the wheels on both sides of the frame member 10, except to state that as a result of the connection by the chain sections 37, 37a, one associated member or spring-supporting arm 30 moves upward as the other one on the other side of the frame member 10 moves downward.

The associated member A or wheel-supporting member is provided on its side opposite to the wheel spindle 23 with an outwardly projecting paw or arm 27 to provide another seat for the top of coil spring 34.

The end portion of the arm 27 may be provided with a depending cylindrical lug 27a engaging the inside of the coil spring 34 to hold the coil spring in place. The arm 27 is preferably substantially flat at its outer end to provide a seat 27b for the coil spring 34, but it may be increased in thickness as it approaches the hub 18, and may be provided with a reinforcing flange 27c.

The arm 27 preferably extends substantially parallel to the spring hanger arm 30 so that both of these members are in position to be seated against the ends of the spring 34.

Referring to Fig. 5, the hub 23a and shaft 23 preferably support the brake mechanism and wheel 24, as follows: The hub 23a may be provided with a reduced portion 23c and a brake-supporting plate 60 may be mounted upon this reduced portion to support the usual fixed brake mechanism. The wheel 24 is provided with a hub 61, which is mounted by means of anti-friction bearings 62, 63 on the shaft 23, and secured in place by a nut 64.

A suitable oil seal 65 and hub cap 66 are provided to keep the lubricant in the bearings 62, 63. The wheel 24 carries a brake drum 67 for cooperating with the brake mechanism which is carried by plate 60.

The operation of the vehicle wheel mounting is as follows: Each of the wheels is supported by its shaft 23, which in turn is carried by the wheel-carrying arm or associated member A. Each wheel is free to turn at the rate of speed which is determined by engagement of the particular wheel with the terrain, and there is no tendency toward drag of one wheel by the other.

The weight placed upon the wheel spindle by the frame 10 tends to cause the wheel-carrying assembly A to pivot in a counter-clockwise direction in Fig. 1; but this movement is resisted by the spring 34, which in turn engages the spring-carrying arm 30. Thus the wheel is spring-supported, and each wheel is adapted to absorb the individual shocks caused by its engagement with irregular terrain or obstructions.

The spring-supporting arm or associated member 30 reacts against the chain 37, which is counter-balanced over the pulley sheave C against a similar mechanism supporting the other wheel of the pair. Thus the assembly of two wheels is so arranged that even though one of the wheels strikes terrain which is much higher than that engaged by the other, the complete wheel assembly A may rotate upon the shaft 13 to adjust the height of each wheel to the terrain through the reaction of one assembly against the other through chain 37.

The load is, therefore, uniformly distributed between the two wheels at all times, and any sudden shock received by either wheel, such as, for example, when the wheel strikes a sudden bump in the road, causes the spring 34 to be compressed, which will cushion the shock to the compensating mechanism and to the vehicle. This is true even if both wheels should strike the same bump simultaneously.

In the event that the spring 34 should become broken spring-carrying arm 31 may move toward the associated member A until it hits the outside of arm A so that the vehicle will be supported at all times, irrespective of breakage of springs.

It will thus be observed that I have invented an improved form of vehicle wheel mounting which is adapted to compensate for unevenness of the roadway engaged by either one of a pair of wheels and by means of which each wheel is separately spring mounted to absorb individual shocks.

The present mechanism has a minimum number of bearings requiring lubrication, and it is simple and effective. All of the disadvantages inherent in the devices of the prior art, where two wheels are fixedly secured to rotate together, are substantially eliminated by the use of the present vehicle wheel mounting.

The vehicle wheel mountings constructed according to the invention require a minimum amount of care, they are sturdy, and capable of economical manufacture so that they may be placed within the range of a vast number of users.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a vehicle, a mounting for a pair of wheels including, a pair of wheel-carrying assemblies hinged at one end for up and down movement, an associated member located below each wheel-carrying assembly in the same vertical plane with the wheel-carrying assembly, one end of said associated member connected to the wheel-carrying assembly, the other end of the member extending beyond the hinge portion of the wheel-carrying assembly, compensating mechanism connecting said other extending ends of said members, a paw on each wheel-carrying assembly, a compression spring between said paw and the associated member, said paw and compression spring acting to keep the member normally spaced a predetermined distance below the hinge of the wheel-carrying assembly, whereby upward movement of a wheel-carrying assembly will cause opposite movement of the extending end of its associated member and any sudden upward movement of the wheel-carrying assembly will cause said spring to compress and cushion the shock while permitting the associated member to come closer to the hinge portion of the wheel-carrying assembly.

2. In a vehicle, a mounting for a pair of wheels including, a pair of wheel-carrying assemblies, said assemblies hinged for up and down movement, each wheel-carrying assembly having a downwardly extending portion, an associated member located below each wheel-carrying assembly in the same vertical plane with the wheel-carrying assembly, one end of said associated member pivotally connected to the downwardly extending portion of the wheel-carrying assembly, the other end of the associated member extending beyond the hinge portion of the wheel-carrying assembly, compensating mechanism connecting said other extending ends of said members, a paw extending from the hinge portion of each wheel-carrying assembly, a compression spring between said paw and the associated member, said paw and compression spring acting to keep the member normally spaced a predetermined distance below the hinge portion of the wheel-carrying assembly, whereby any sudden upward movement of the wheel-carrying assembly will cause said spring to compress and cushion the shock while permitting the member to come closer to the hinge portion of the wheel-carrying assembly.

3. In a vehicle, a mounting for a pair of vehicle wheels, comprising a supporting shaft adapted to be carried by a vehicle frame member, each end of said shaft being provided with a wheel-carrying assembly pivotally mounted on said shaft, said wheel-carrying assembly including a radially extending arm supporting a wheel shaft upon which a wheel is mounted for rotation, and including an oppositely extending portion for connection to a compensating device, and a compensating device comprising a tension member connected to both of said oppositely extending portions and extending over a rotatable member whereby each wheel-carrying assembly reacts against the other and the load placed upon the two wheels is substantially equally distributed, each wheel-carrying assembly also including a resilient member interposed between its oppositely extending portion and an extension of its wheel-supporting arm whereby each wheel is separately spring mounted against transmission of road shocks to the other wheel-carrying assembly or to the vehicle.

4. In a vehicle, a mounting for a pair of vehicle wheels, comprising a supporting shaft adapted to be carried by a vehicle frame member, each end of said shaft being provided with a wheel-carrying assembly pivotally mounted on said shaft, said wheel-carrying assembly including a radially extending arm supporting a wheel shaft upon which a wheel is mounted for rotation, and including an oppositely extending portion for connection to a compensating device, and a compensating device comprising a tension member connected to both of said oppositely extending portions and extending over a rotatable member whereby each wheel-carrying assembly reacts against the other and the load placed upon the two wheels is substantially equally distributed, each wheel-carrying assembly also including a resilient member interposed between its oppositely extending portion and an extension of its wheel-supporting arm whereby each wheel is separately spring mounted against transmission of road shocks to the other wheel-carrying assembly or to the vehicle, said resilient member comprising a helical coil spring mounted to be compressed between parts of the wheel-carrying assembly.

5. In a vehicle wheel mounting, the combination of a supporting frame member with a transverse shaft carried by said frame member and projecting laterally at each end of said shaft from said frame member, a wheel-carrying assembly mounted on each end of said shaft, said wheel-carrying assembly comprising an arm provided with a hub and bearings for engagement with said shaft, said arm having at one end a wheel spindle and a wheel carried by said spindle, and said arm having an oppositely extending spring seating portion located on the other side of said bearing, a spring-supporting lever pivotally mounted on said arm on one side of said bearing, and having engagement with a spring located on the other side of said bearing, the opposite end of said spring engaging said oppositely extending spring-seating portion, and connecting means between the levers of the wheel-carrying assemblies whereby upward force on one wheel results in a reaction transmitted to the wheel-carrying assembly of the other wheel to distribute the load equally between said wheels.

6. In a vehicle wheel mounting, the combination of a supporting frame member with a transverse shaft carried by said frame member and projecting laterally at each end of said shaft from said frame member, a wheel-carrying assembly mounted on each end of said shaft, said wheel-carrying assembly comprising an arm provided with a hub and bearings for engagement with said shaft, said arm having at one end a wheel spindle and a wheel carried by said spindle, and said arm having an oppositely extending spring seating portion located on the other side of said bearing, a spring-supporting lever pivotally mounted on said arm on one side of said bearing, and having engagement with a spring located on the other side of said bearing, the opposite end of said spring engaging said oppositely extending spring-seating portion, and connecting means between the levers of the wheel-carrying assemblies whereby upward force on one wheel results in a reaction transmitted to the wheel-carrying assembly of the other wheel to distribute the load equally between said wheels, said connecting means comprising a tension member extending over a rotatable member.

7. In a vehicle wheel mounting, the combination of a supporting frame member with a transverse shaft carried by said frame member and projecting laterally at each end of said shaft from said frame member, a wheel-carrying assembly mounted on each end of said shaft, said wheel-carrying assembly comprising an arm provided with a hub and bearings for engagement with said shaft, said arm having at one end a wheel spindle and a wheel carried by said spindle, and said arm having an oppositely extending spring-seating portion located on the other side of said bearing, a spring-supporting lever pivotally mounted on said arm on one side of said bearing, and having engagement with a spring located on the other side of said bearing, the opposite end of said spring engaging said oppositely extending spring-seating portion, and connecting means between the levers of the wheel-carrying assemblies whereby upward force on one wheel results in a reaction transmitted to the wheel-carrying assembly of the other wheel to distribute the load equally between said wheels, said connecting means comprising a tension member extending over a rotatable member, and said tension member comprising a chain.

8. In a vehicle wheel mounting, the combination of a supporting frame member with a transverse shaft carried by said frame member and projecting laterally at each end of said shaft from said frame member, a wheel-carrying assembly mounted on each end of said shaft, said wheel-carrying assembly comprising an arm provided with a hub and bearings for engagement with said shaft, said arm having at one end a wheel spindle and a wheel carried by said spindle, and said arm having an oppositely extending spring-seating portion located on the other side of said bearing, a spring-supporting lever pivotally mounted on said arm on one side of said bearing, and having engagement with a spring located on the other side of said bearing, the opposite end of said spring engaging said oppositely extending spring-seating portion, and connecting means between the levers of the wheel-carrying assemblies whereby upward force on one wheel results in a reaction transmitted to the wheel-carrying assembly of the other wheel to distribute the load equally between said wheels, said connecting means comprising a tension member extending over a rotatable member, and said tension member comprising a chain, said chain being anchored to said rotatable member.

9. In a vehicle wheel mounting, the combination of a supporting frame member with a transverse shaft carried by said frame member and projecting laterally at each end of said shaft from said frame member, a wheel-carrying assembly mounted on each end of said shaft, said wheel-carrying assembly comprising an arm provided with a hub and bearings for engagement with said shaft, said arm having at one end a wheel spindle and a wheel carried by said spindle, and said arm having an oppositely extending spring-seating portion located on the other side of said bearing, a spring-supporting lever pivotally mounted on said arm on one side of said bearing, and having engagement with a spring located on the other side of said bearing, the opposite end of said spring engaging said oppositely extending spring-seating portion, and connecting means between the levers of the wheel-carrying assemblies whereby upward force on one wheel results in a reaction transmitted to the wheel-carrying assembly of the other wheel to distribute the load equally between said wheels, said connecting means comprising a tension member extending over a rotatable member, and said tension member comprising a chain, said chain being provided with universal joints intermediate the rotatable member and each wheel-carrying assembly.

10. A mounting for a pair of vehicle wheels including a pair of wheel-carrying assemblies, each of said wheel-carrying assemblies comprising an arm hingedly connecting a wheel shaft with a vehicle part for up and down movement, an abutment member carried with each said arm, a lever pivoted to each said arm on one side of its axis of movement relative to the vehicle part and extending to one side of and past said axis to lie in opposition to the abutment carried by that arm, a resilient compression member acting between each said lever and the abutment to which it lies in opposition, and compensating mechanism connecting the lever of each wheel-carrying assembly with the lever of the other wheel-carrying assembly.

11. A structure as specified in claim 10 wherein the resilient compression members are coiled compression springs.

12. A structure as specified in claim 10 wherein the compensating mechanism comprises a rotary member supported by a vehicle part, and tension members extending from the levers to said rotary member.

13. A mounting for a pair of vehicle wheels including a pair of wheel-carrying assemblies, each of said wheel-carrying assemblies comprising an arm hingedly connecting a wheel shaft with a vehicle part for up and down movement, an abutment member carried with each said arm which moves down when the vehicle shaft associated with that arm moves up and vice-versa, a lever pivoted to each said arm in the vicinity of its associated wheel shaft and underlying its associated abutment member, a resilient compression member acting between each said abutment member and its underlying lever, and compensating mechanism for connecting the lever of each wheel-carrying assembly with the lever of the other wheel-carrying assembly.

ERNEST M. BOLZE.